United States Patent
Nepereny et al.

[15] 3,699,750
[45] Oct. 24, 1972

[54] AIR POLLUTION CONTROL APPARATUS

[72] Inventors: Harold A. Nepereny, Wexford; John P. Reich, Baden, both of Pa.

[73] Assignee: Koenig, A. G.

[22] Filed: July 17, 1970

[21] Appl. No.: 55,653

[52] U.S. Cl. .......................... 55/288, 55/305, 55/341
[51] Int. Cl. .............................................. B01d 41/00
[58] Field of Search ................. 55/304, 305, 288, 341

[56] References Cited

UNITED STATES PATENTS

| | | |
|---|---|---|
| 1,168,543 | 1/1916 | Newhouse ............... 55/304 X |
| 1,806,513 | 5/1931 | Von Waldenburg ..... 55/341 X |
| 2,137,254 | 11/1938 | Turnbull ..................... 55/304 |
| 2,830,676 | 4/1958 | Schneider ................... 55/304 |
| 3,217,468 | 11/1965 | O'Dell ...................... 55/341 X |
| 2,932,362 | 4/1960 | Roper ...................... 55/304 X |

*Primary Examiner*—Robert L. Lindsay, Jr.
*Attorney*—Michael Williams

[57] ABSTRACT

Air pollution control apparatus herein disclosed comprises a large upright casing, with a plurality of elongated air-pervious bags extending vertically within the casing, each air bag having its lower end fixed to a partition plate in line with an opening in the latter and its upper end closed and fixed to a grid frame. Dust-laden air is caused to flow upwardly through the air bags, the dust being filtered from the air and remaining within the bags and the dust-free air passing into the casing for exhaust through a casing outlet.

The grid frame is spring-supported and means are provided to vibrate the grid frame and consequently the air bags suspended from the grid frame. This vibration is performed at a time when dust-laden air is not being admitted to the casing inlet, and is for the purpose of shaking the dust particles from the interior of the air bags.

The air bags are disposed in two groups with a space therebetween large enough to accommodate a person for the purpose of inspecting the condition of the air bags.

9 Claims, 5 Drawing Figures

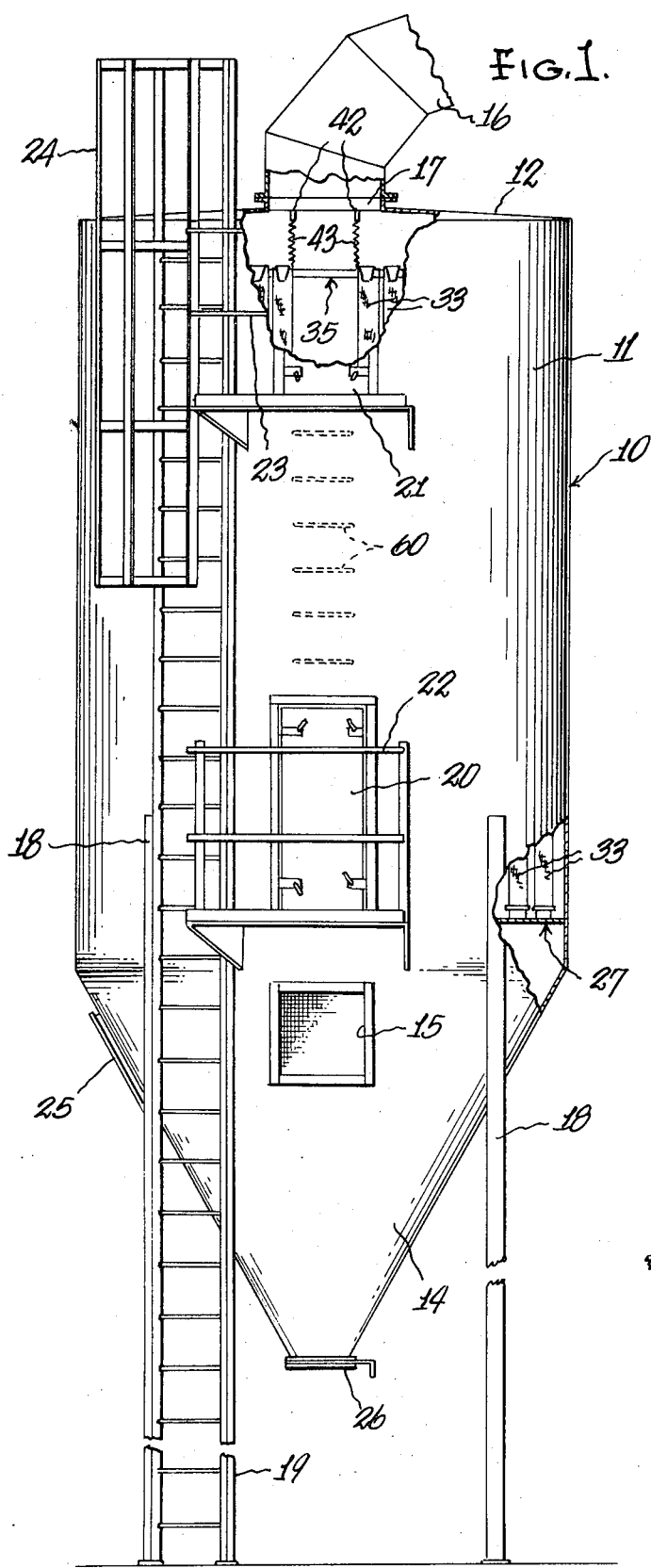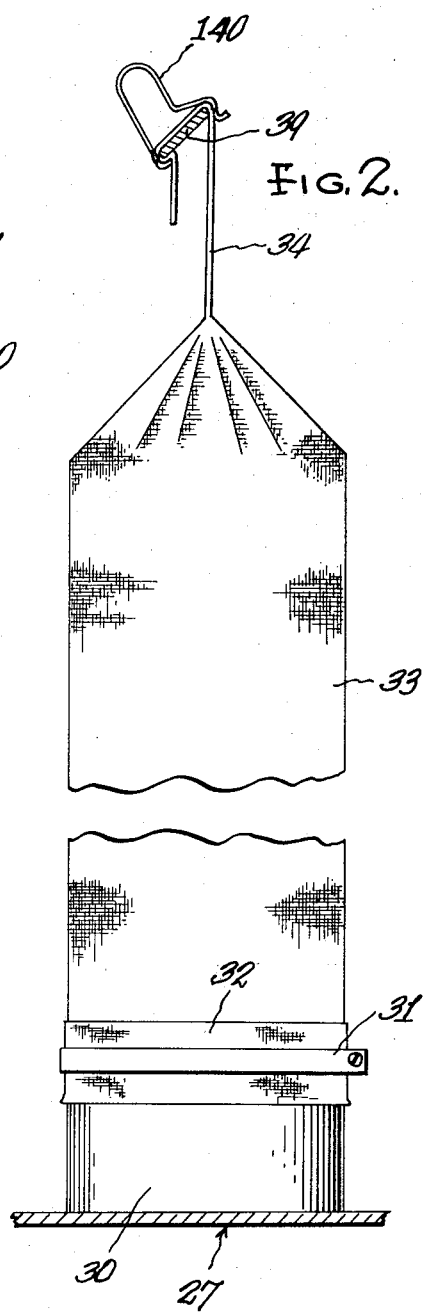

PATENTED OCT 24 1972 3,699,750
SHEET 2 OF 2
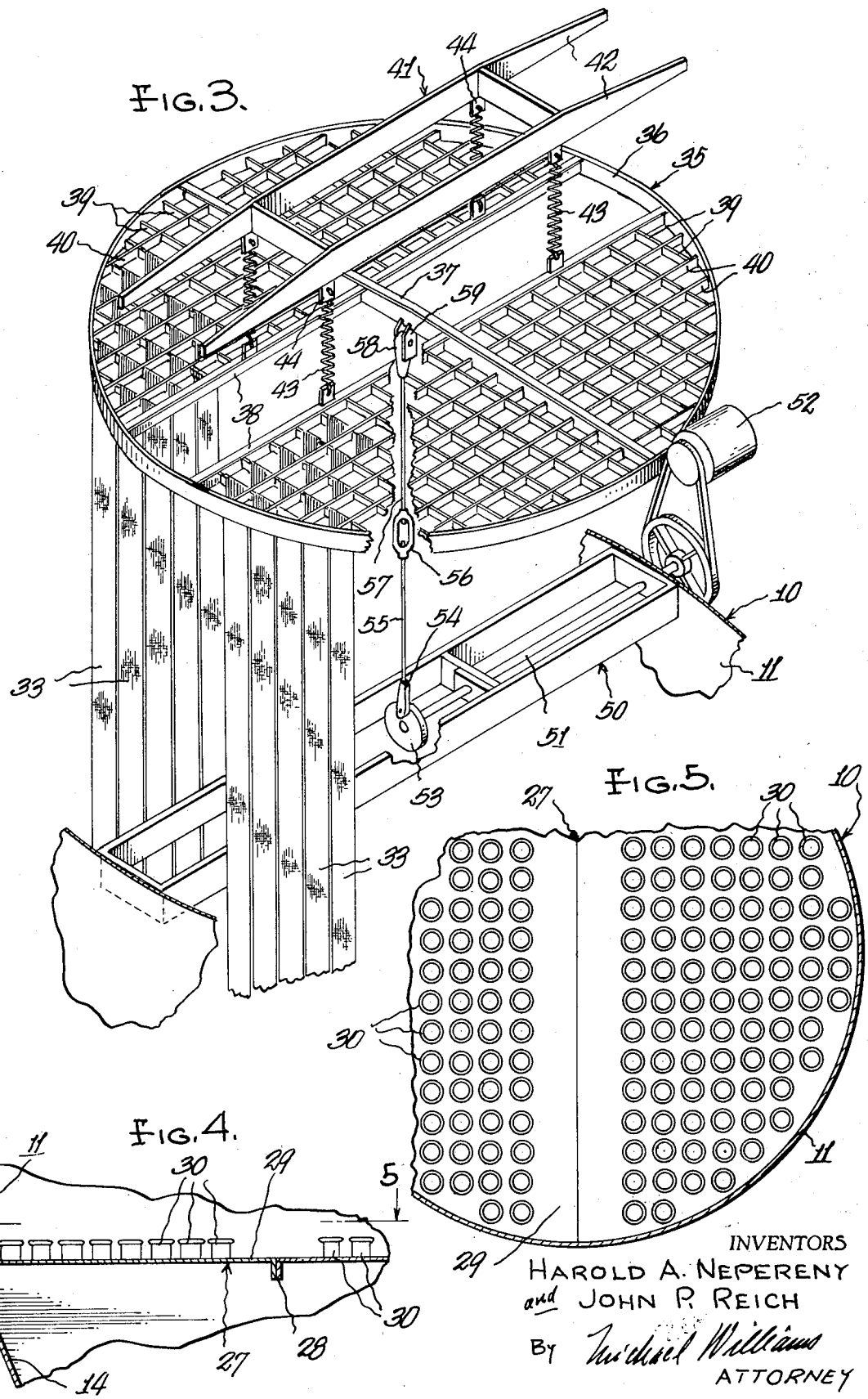
INVENTORS
HAROLD A. NEPERENY
and JOHN P. REICH
By Michael Williams
ATTORNEY

3,699,750

AIR POLLUTION CONTROL APPARATUS

BACKGROUND AND SUMMARY

The removal of dust particles from dust-laden air is an old art and finds an early beginning in vacuum cleaners wherein an air pervious bag is used to filter dust particles from the air, the dust particles remaining in the bag and the air, free of such particles, being returned to the atmosphere. U.S. Pat. No. 1,240,305 shows an early application of this principle to the removal of dust particles in a commercial installation.

Our invention is particularly suited for commercial use where dust-laden air from furnaces, cement plants and other apparatus which creates dust in its operation, is to be filtered to avoid contamination of the atmosphere. Our invention provides a highly efficient filtering apparatus which is of simplified yet durable construction. Dust laden air is accumulated from the source and is directed to a casing in which a plurality of air-pervious bags are suspended. The air is caused to flow through the air bags and the dust particles are filtered from the air and remain in the air bags, while the dust-free air is exhausted from an outlet in the casing.

After a period of use, sufficient dust collects within the air bags to impair their filtering efficiency and therefore the flow of dust-laden air to the casing is interrupted and the air bags are shaken to remove the dust from therewithin. Our invention provides an efficient construction for supporting the air bags in vertical and taut relation, and for shaking the bags to remove dust therefrom. Therefore, a principal object of our invention is to provide new and improved apparatus for controlling air pollution.

DESCRIPTION OF THE DRAWINGS

In the drawings accompanying this description and forming a part of this specification, there is shown, for purposes of illustration, an embodiment which our invention may assume, and in these drawings:

FIG. 1 is a side elevational view of apparatus incorporating our invention, parts being broken away to show interior construction, FIG. 2 is a broken, elevational view of an air bag, showing its attachment top and bottom, FIG. 3 is a fragmentary perspective view showing construction in the interior of the upper portion of the apparatus, FIG. 4 is a fragmentary sectional view of a detail of the construction, and FIG. 5 is a fragmentary sectional view corresponding to the line 5—5 of FIG. 4.

DESCRIPTION OF PREFERRED EMBODIMENT

Referring particularly to FIG. 1 of the drawings, the embodiment herein disclosed comprises an upright casing 10 of considerable proportions. The casing is formed as a fabrication of sheet metal with all components preferably joined by welding. The casing has a cylindrical portion 11, a slightly domed top 12 and a conical lower portion 14.

An inlet opening 15 is provided in the conical portion 14 to receive dust-laden air from a source, such as a furnace and the like. As an example, a hood (not shown) may be disposed adjacent the furnace to collect dust-laden air, and a conduit (also not shown) leads such air from the hood to the inlet 15. A conduit 16 is attached to the exhaust opening 17 of the casing to lead the filtered air to the atmosphere. A blower (not shown) may be installed within the conduit 16 to blow air out of this conduit and at the same time cause dust-laden air to be drawn into the inlet 15. Or, a blower may be installed in the conduit leading from the hood to draw air from the hood and force it into the inlet 15.

The casing is preferably supported from a ground or floor surface by means of legs 18, and a ladder 19 is provided so that a workman may climb all the way to the top of the casing. A lower door 20 is provided to control an opening into the casing, preferably just above the conical portion 14, and an upper door 21 is provided to control an opening into the casing, preferably near the top thereof. Protection cages 22 and 23 are positioned outside the casing and in line with respective doors 20, 21, and an elongated protection cage 24 is positioned adjacent to the top of the ladder, so that a workman may not inadvertently fall. A fluid-tight access door 25 is provided near the upper part of the conical portion 14, and a manually operable slide gate 26 is provided at the lower end of the conical portion so that dust collected in the latter may be removed.

Extending across the lower end of the cylindrical portion 11 is a partition plate 27 formed, as shown in FIGS. 4 and 5, of two semi-circular pieces which are welded together at 28 and welded at their peripheries to the inner wall of the cylindrical portion. The partition plate is formed with a pattern of openings to form two groups on either side of the center, the center 29 forming a walkway for a purpose to be disclosed. A thimble 30 is welded into each partition plate opening, the upper end of the thimble being open so that air entering the inlet 15 of the casing must pass upwardly through the thimbles.

Secured to each thimble, as by means of a clamp 31 (see FIG. 2) is the cuffed lower end 32 of an elongated, tubular, air-pervious bag 33 which may be formed of a suitable fabric material. The upper end of each air bag is puckered to provide a closed flap 34 which is connected to a grid frame 35. As best seen in FIG. 4, the grid frame comprises a round metal band 36 with a main cross member 37 extending diametrically of the band and having its opposite ends welded thereto. A pair of cross members 38—38 are welded in spaced-apart relation crosswise of the band. A series of cross members 39 and 40 are welded in position to fill the space between each cross member 38 and the inner periphery of the band and to form two groups of grid openings, the openings in each group corresponding to the spacing of the thimbles and being in vertical alignment therewith. Each air bag extends vertically upwardly from a thimble 30 and its closed upper end 34 extends through an aligned grid opening and is draped over a cross member 39, the latter being slightly inclined to the vertical, as seen in FIG. 2. A spring clip 140 is snapped over the draped portion of the closed upper end to hold it to the cross member 39.

A frame member 41 (see FIG. 3) supports the grid frame 35 and comprises a part of spaced arms 42—42 which are welded to the inside surface of the top 12 of the casing 10. A plurality of coil springs 43 (here shown to be four in number) freely suspend the grid frame 35 from the frame member 41, and are connected between lugs 44 welded to and depending from each of the arms 42, and lugs welded to and extending upwardly from the cross members 38.

A support member 50 (see FIG. 3) is disposed below the grid frame and comprises a box-like structure which is welded across the inner walls of the cylindrical portion 11 of the casing. A shaft 51 is rotatable in bearings carried by the support member and is driven by a motor 52 which is supported on a platform (not shown) carried by the cylindrical portion 11 of the casing 10. A wheel 53 is fixed to the inner end of the shaft and positioned centrally of the casing. An arm 54 is pivoted in eccentric manner to the wheel 53 and has a connection 55 with a turnbuckle 56. Another connection 57 extends upwardly from the turnbuckle and is provided with an arm 58 pivotally connected between plates 59 welded to and centrally of the main cross member 37.

In operation, dust-laden air is taken from a source and enters the casing inlet 15 and from there flows upwardly through the air bags 33. The dust is filtered from the air and remains within the air bags, while the dust-free air passes to the interior of the casing and is exhausted therefrom through the casing outlet 17 and conduit 16.

After a predetermined period of operation (depending upon the amount of dust in the air) the air bags will have their efficiency decreased and therefore must be cleaned of accumulated dust. For this operation, the input of dust-laden air to the inlet 15 is interrupted and the motor 52 is energized to rotate the wheel 53. The eccentric connection of the arm 54 causes a vertical reciprocation of the connection with the grid frame and therefore causes the latter to reciprocate vertically and in turn cause a vertical jiggling of all of the air bags 33 to cause the dust accumulated therein to drop to the partition plate 27 and fall through the openings therein and collect within the conical partition 14, from where it may be removed through the lower opening which is controlled by the slide gate 26.

Since the air bags are arranged in two groups, a vertical space is established between the groups which is large enough to accommodate a workman. The lower door 20 is aligned with the walkway 29 of the partition plate 27, thus making it easy for a workman to enter through the door 20 and stand on the walkway to inspect the air bags 33. The upper door 21 is also in alignment with the vertical space between the air bags thus making it easy for a workman to inspect the upper end of the air bags and the supporting mechanism therefor. Rungs 60 may be welded to the interior wall of the cylindrical portion 11 of the casing to enable a workman to inspect the entire length of the air bags.

We claim:

1. Air pollution control apparatus comprising an upright casing having an inlet at its lower end for admission of dust-laden air and an outlet at its upper end for the exhaust of dust-free air, a partition plate mounted within said casing and above said inlet and having openings through which the dust-laden air must flow, a rigid grid frame formed from a series of intersecting members, means within said casing freely and elastically suspending said grid frame below said casing outlet, a plurality of elongated air-pervious bags, each having its lower end fixed to said partition plate so that dust-laden air flowing through an opening enters the lower end of a respective bag, the upper end of each bag being closed so that air passes through said bag to the interior of said casing, the dust particles being thus filtered from said air and remaining within said air bags while the dust-free air exits through said casing outlet and to the atmosphere, each said bag having its closed end affixed to said frame, means for causing flow of dust-laden air into said inlet and upwardly into said bags, and means for imparting motion to said elastically suspended grid frame at a time when air is not flowing through said air bags so as to in turn cause vibratory waves to travel along said air bags substantially in unison and remove dust from the interior thereof, said dust gravitating within said bags and falling through openings in said partition plate and collecting in a lower part of said casing for subsequent removal.

2. The construction of claim 1 wherein each said bag has its closed end extending upwardly through a grid opening and draped over an intersecting member forming said opening.

3. The construction according to claim 1 wherein said partition plate has a space therebetween to define a walkway and wherein said bags are affixed to said grid frame in substantial vertical alignment with said partition openings whereby a vertically extending passageway is formed between the bags to provide space for a person on said walkway.

4. The construction of claim 1 wherein said grid frame is suspended by spring means.

5. The construction of claim 4 wherein a frame member is disposed within said casing and fixedly connected to an upper end thereof, wherein said grid frame is spaced below said frame member, and wherein a plurality of coil springs are connected between said frame member and said grid frame to freely support the latter.

6. The construction of claim 5 wherein a support member is fixedly connected to said casing and spaced below said grid frame, said support member carrying a rotatable member, and a connection between said grid frame and said rotatable member to translate rotary motion of said rotatable member to vertical vibration of said grid frame.

7. The construction according to claim 1 wherein said grid frame is formed of a circular metal band with said crossing members supported within said band and a main member extending diametrically across said band and having its opposite ends fixed to said band, a frame member disposed within said casing and fixedly connected to an upper end thereof, said frame member being spaced upwardly of said grid member and including a pair of spaced arms, a pair of coil springs having their upper ends connected at spaced places to each of said spaced arms and their lower ends connected to cross members of said grid frame to freely suspend the latter, a support member below said grid frame and extending crosswise of and fixedly secured to said casing, a rotatable wheel carried by said support member centrally of said casing, and a connection member having its upper end connected to and centrally of said main member and its lower end eccentrically connected to said rotatable wheel, to translate rotation of said wheel to vertical vibration of said grid frame.

8. The construction of claim 7 wherein a turn buckle is interposed in said connection member to adjust the spring support of said grid frame.

9. The construction according to claim 3 wherein said casing has a lower door-controlled opening aligned with the walkway of said partition plate, and an upper door-controlled opening adjacent to said grid frame to provide access to the latter.

* * * * *